(12) United States Patent
Lwali et al.

(10) Patent No.: US 10,752,443 B1
(45) Date of Patent: Aug. 25, 2020

(54) ADJUSTABLE CHIMNEY CHUTE

(71) Applicant: Amazon Technologies, Inc., Seattle, WA (US)

(72) Inventors: Racha Lwali, Seattle, WA (US); Bruce Leardi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/508,987

(22) Filed: Jul. 11, 2019

(51) Int. Cl.
*B65G 11/14* (2006.01)
*B65G 11/10* (2006.01)
*B65G 11/04* (2006.01)

(52) U.S. Cl.
CPC ............ *B65G 11/143* (2013.01); *B65G 11/04* (2013.01); *B65G 11/10* (2013.01); *B65G 11/103* (2013.01); *B65G 11/146* (2013.01)

(58) Field of Classification Search
CPC ....... B65G 11/10; B65G 11/103; B65G 11/00; B65G 11/023; B65G 11/126; B65G 11/146; B65G 11/14; B65G 11/183; B65G 11/143; B65G 11/04
USPC .............. 193/25 R, 25 E, 25 C, 31 A, 34, 14
See application file for complete search history.

(56) References Cited

U.S. PATENT DOCUMENTS

| | | | | |
|---|---|---|---|---|
| 1,006,689 | A * | 10/1911 | Schwarz | B65G 11/103 193/25 R |
| 2,712,797 | A * | 7/1955 | Woehrle | B65D 90/046 296/39.1 |
| 3,035,682 | A * | 5/1962 | Ferch | B65G 11/106 198/550.1 |
| 4,295,815 | A * | 10/1981 | Eltvedt | B29C 45/1771 425/444 |
| 4,355,493 | A * | 10/1982 | Ellert | B65B 39/007 53/113 |
| 4,741,687 | A * | 5/1988 | Eltvedt | B29C 45/1771 193/2 A |
| 6,564,922 | B1 * | 5/2003 | Taylor | B65G 11/103 198/360 |
| 2011/0233027 | A1 * | 9/2011 | Kolbe | B30B 11/005 193/31 A |

* cited by examiner

*Primary Examiner* — James R Bidwell
(74) *Attorney, Agent, or Firm* — Thomas Horstemeyer, LLP

(57) ABSTRACT

Disclosed are various embodiments for an adjustable chute configured to funnel containers or packages into different types of bulk containers and bulk containers of different sizes. In one embodiment, the adjustable chute comprises a front panel, a rear panel, and first and second flexible sidewalls that can expand and contract between the front and rear panels. The front panel has a first hinged connection configured to move between a first position and a second position along a path of a chimney chute. The rear panel has a second hinged connection to the chimney chute.

20 Claims, 9 Drawing Sheets

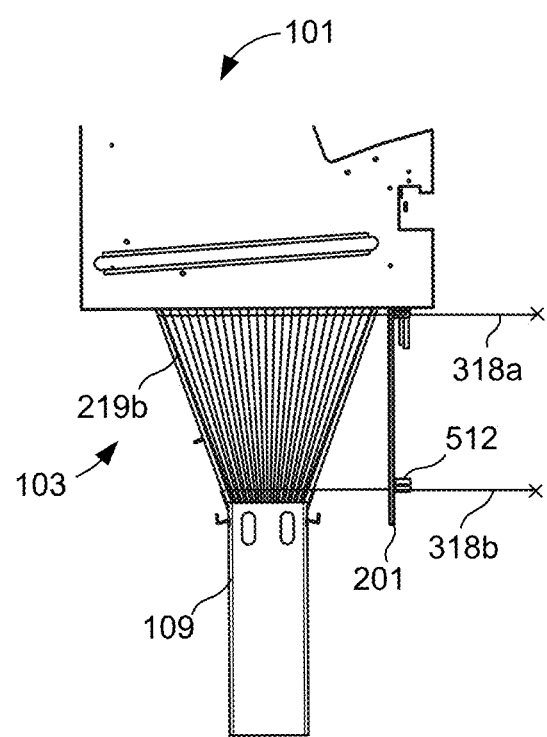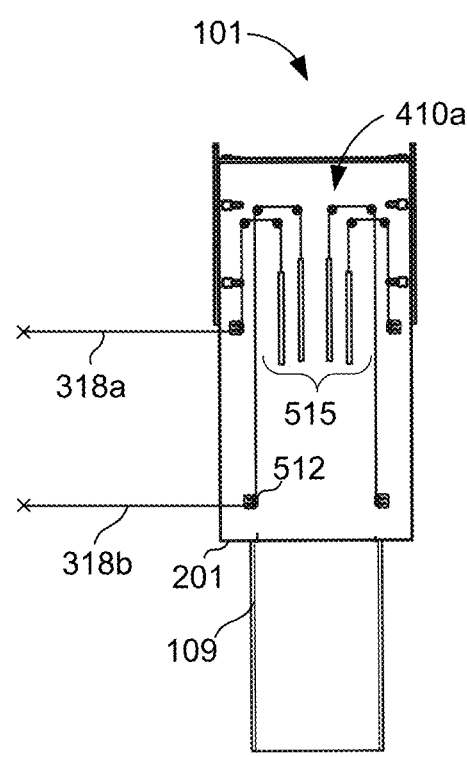
FIG. 5A
FIG. 5B

ADJUSTABLE CHIMNEY CHUTE

BACKGROUND

In a product fulfillment context, an entity may have different conveyance structures arranged for moving packages throughout a facility in preparation for shipment. Several conveyance structures may be assembled for a single purpose, such as feeding packages to certain bulk containers. These conveyance structures may occupy considerable space within the facility and may take considerable time to construct.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5A depicts a side view of the adjustable chute assembly according to various embodiments of the present disclosure.

FIG. 5B depicts a rear view of a first retraction system of the adjustable chute assembly according to various embodiments of the present disclosure.

DETAILED DESCRIPTION

The present disclosure relates to an adjustable chute configured for attachment to a conveyance structure in a facility. The adjustable chute can expand and contract in order to enable packages to be received from the conveyance structure (e.g., chimney chute) and funneled into bulk containers of different sizes. Typically, in a product fulfillment context, a fulfillment facility may be arranged such that there is a first path of conveyance structures for products or packages being funneled into pallet box containers (e.g., Gaylord containers), in which the pallet box containers may be transported by ground transportation. Also, the fulfillment facility may have a second path of conveyance structures for products or packages being funneled in bulk bags, in which the bulk bags may be transported by air transportation. In some cases, each freight transportation method may have regulations regarding the types of bulk containers that can be used and their dimensions. Further, each set of conveyance structures may have different rigid structural components that take considerable time to arrange. For example, the structural components may include elongated chutes that are built to convey packages from an upper level to a lower level, in which the packages are funneled into bulk containers of a certain size.

The various embodiments of the present disclosure relate to an adjustable chute that enables packages to be funneled into bulk containers of different sizes and funneled into different types of bulk containers. Thus, the embodiments of the present disclosure enable a product workflow for conveying packages into bulk containers of different sizes and different types. Accordingly, for example, instead of having two different paths of conveyance structures for two different types of bulk containers, a single path of conveyance structures can be used for both types of bulk containers.

Figure 1A:
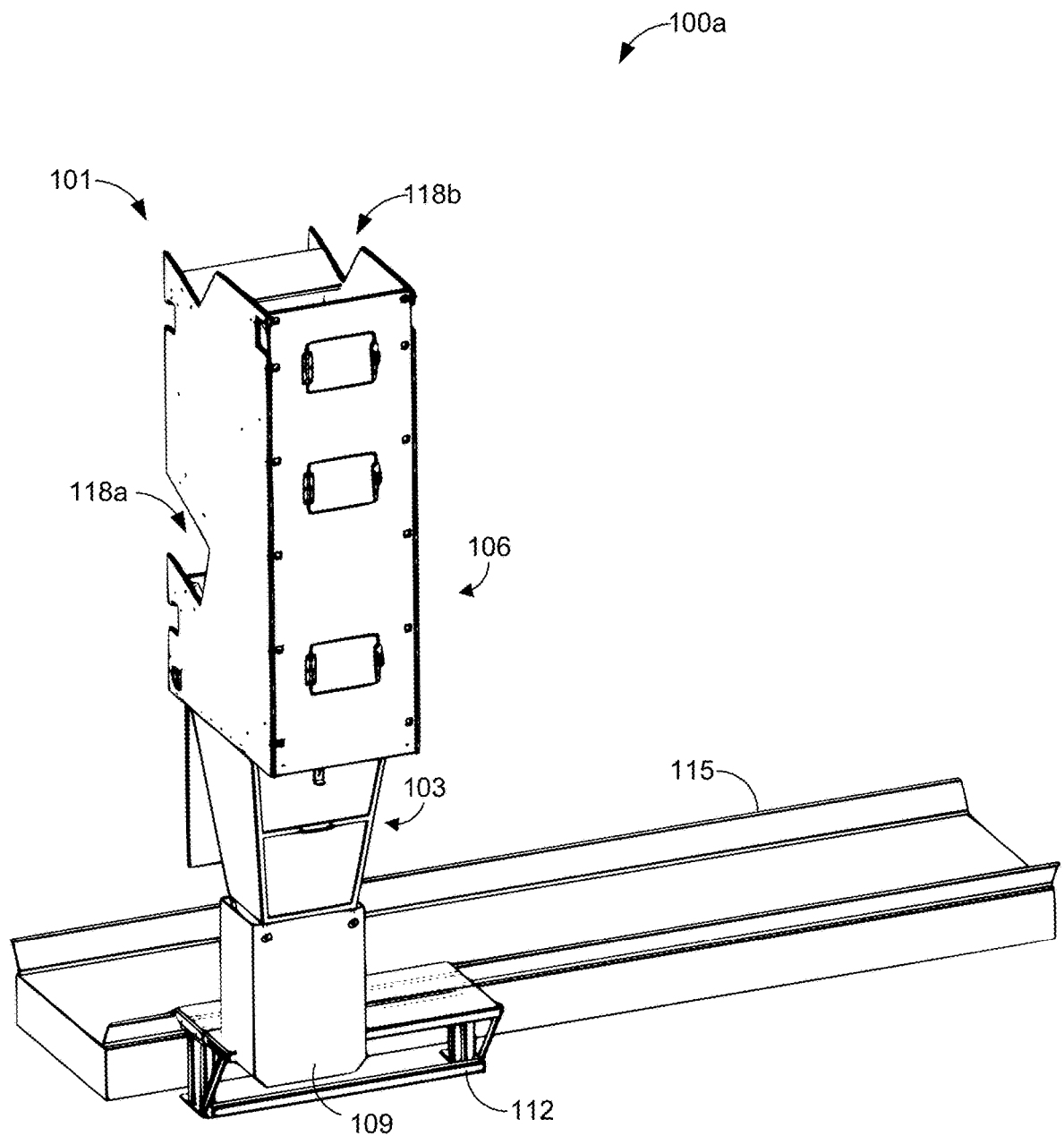
FIG. 1A is a drawing of a first example scenario of an adjustable chute assembly in an open state for use with a bag according to various embodiments of the present disclosure.
Figure 1B:
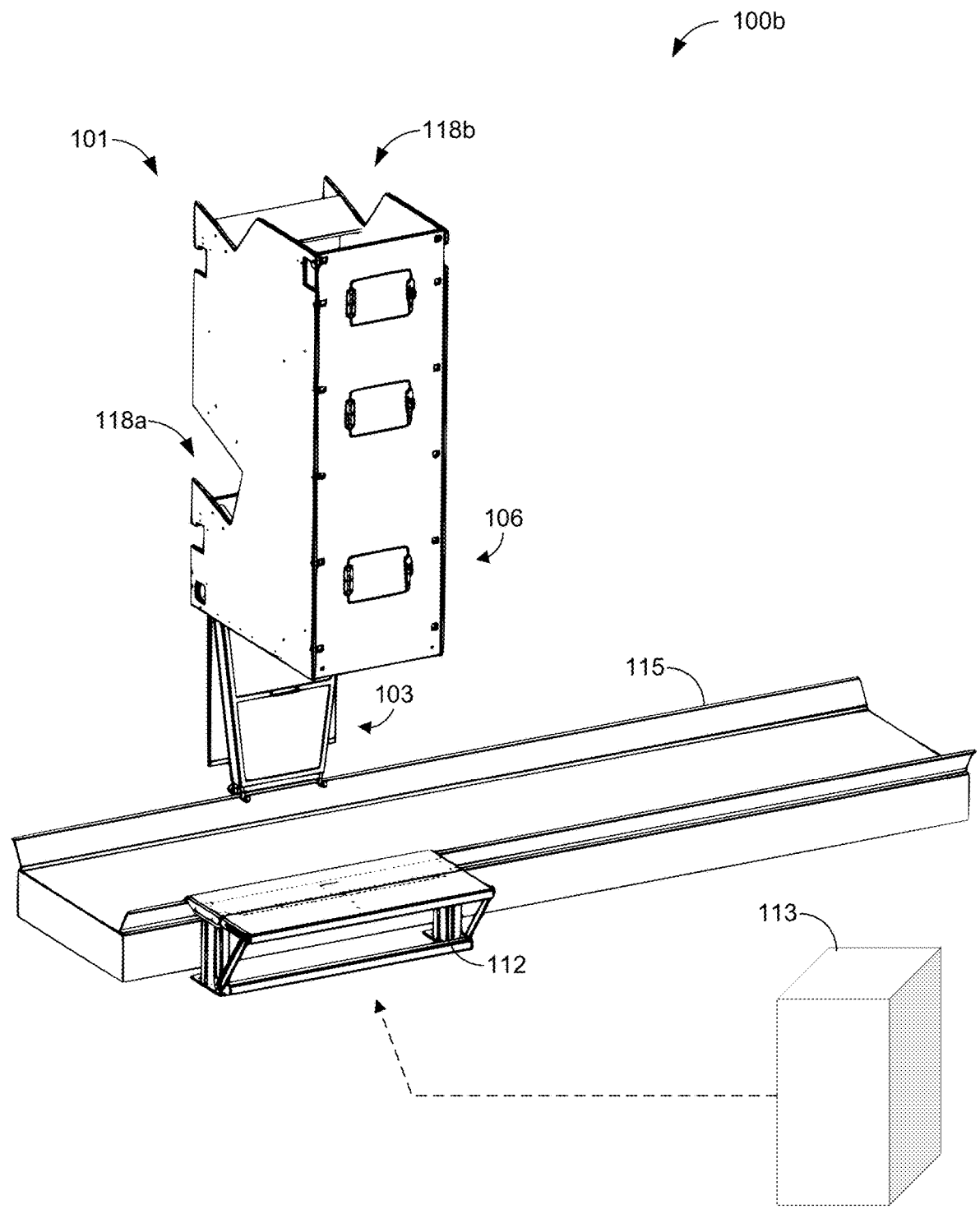
FIG. 1B is a drawing of a second example scenario of the adjustable chute assembly in FIG. 1A in a closed state for use with a different sized container according to various embodiments of the present disclosure.

Beginning with FIG. 1A, shown is a first example scenario 100a of an adjustable chute assembly 101 that includes an adjustable chute 103 and a chimney chute 106. FIG. 1A illustrates the adjustable chute 103 configured in an open state for funneling packages into a container bag 109. FIG. 1A also depicts the container bag 109 hanging from the adjustable chute 103 and positioned on a motorized bench 112. The motorized bench 112 is adjacent to a conveyer system 115. FIG. 1B illustrates a second example scenario 100b of the adjustable chute 103 configured in a closed state for pallet box containers 113 that can be placed underneath the adjustable chute assembly 101, in which case the packages would be funneled into the pallet box container 113 by bypassing the adjustable chute 103.

As described herein, the adjustable chute 103 can expand and contract to funnel packages into bulk containers of different sizes and into different types of bulk containers. For example, the adjustable chute 103 can be expanded to feed a container bag 109, as depicted in FIG. 1A. The container bags 109 may be made in a standard size in order to be containerized in a larger transport container. In one example, container bags 109 may be made to a certain size in order to be further packaged in a unit load device (ULD), which in turn is loaded into a fuselage of an aircraft. In some cases, aircraft regulations may regulate dimensions of the container bags 109. In another example, the ground transportation methods may request that freight packages are packaged into a pallet box container, such as a Gaylord container. The adjustable chute 103 can be compressed or contracted to funnel packages from the chimney chute 106 into pallet box containers 113, as depicted in FIG. 1B.

The chimney chute 106 can represent a funnel structure that receives packages from different levels and feeds them to the adjustable chute 103 or directly into a bulk container, such as the pallet box container 113. In the context of this disclosure, a packages can refer to a flat, a parcel, a package, or other suitable transportation containers. As depicted in the non-limiting example of FIG. 1A, the chimney chute 106 has a first chute opening 118a for receiving packages on a first level and a second chute opening 118b for receiving packages on a second level (collectively the "chute openings 118"). The chute openings 118 feed packages into the adjustable chute 103, when expanded, or directly into a bulk container. As shown in FIGS. 1A and 1B, the chimney chute 106 has rectangular shape. The chimney chute 106 can be constructed in other shapes and dimensions.

The motorized bench 112 is a motorized surface that can move the container bag 109 from underneath the adjustable chute 103 to the conveyer system 115. The conveyer system 115 can be used to transport the container bag 109 to another location within a facility.

In a first non-limiting example, the adjustable chute 103 can be configured in an open state, as shown in FIG. 1A. The container bag 109 can be hung from the adjustable chute 103 in this configuration using hooks, as described in further detail below. Then, packages can be fed into the chute openings 118 of the chimney chute 106. From the chimney chute 106, the packages fall into the adjustable chute 103 and then into the container bag 109. After reaching capacity, the container bag 109 can be unhooked from the adjustable chute 103, and the motorized bench 112 can move the container bag 109 to the conveyor system 115. The conveyor system 115 can then transport the container bag 109 to another location within the facility.

In a second non-limiting example, the adjustable chute 103 can be configured in a closed state, as shown in FIG. 1B. In FIG. 1B, the adjustable chute 103 has been manipulated to compress or contract the dimensions of the adjustable chute 103, substantially moving the adjustable chute 103 out of the path of the chimney chute 106. While in this closed state, the chimney chute 106 can be used to feed packages directly into a different sized pallet box container 113, such as a Gaylord container or other suitable pallet containers. These pallet box containers 113, such as a Gaylord container, can be placed in front of the adjustable chute 103 and directly underneath the chimney chute 106. Thus, the packages being funneled through the chimney chute 106 can bypass the adjustable chute 103 and can be funneled directly in the Gaylord container.

Figure 2:
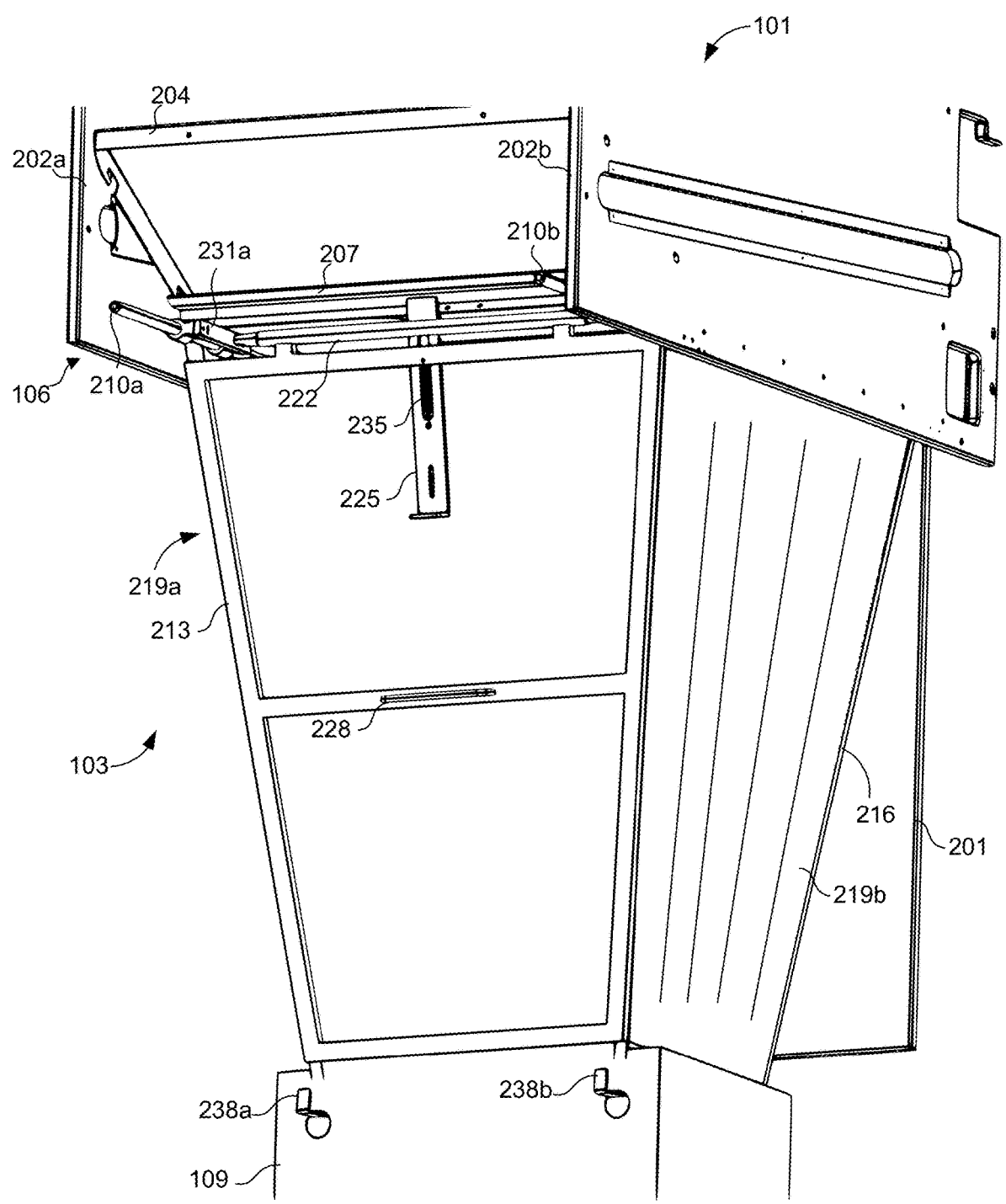
FIG. 2 is an enlarged perspective view of the adjustable chute shown in FIG. 1A, configured in an open position with a bag attached according to various embodiments of the present disclosure.
Figure 3:
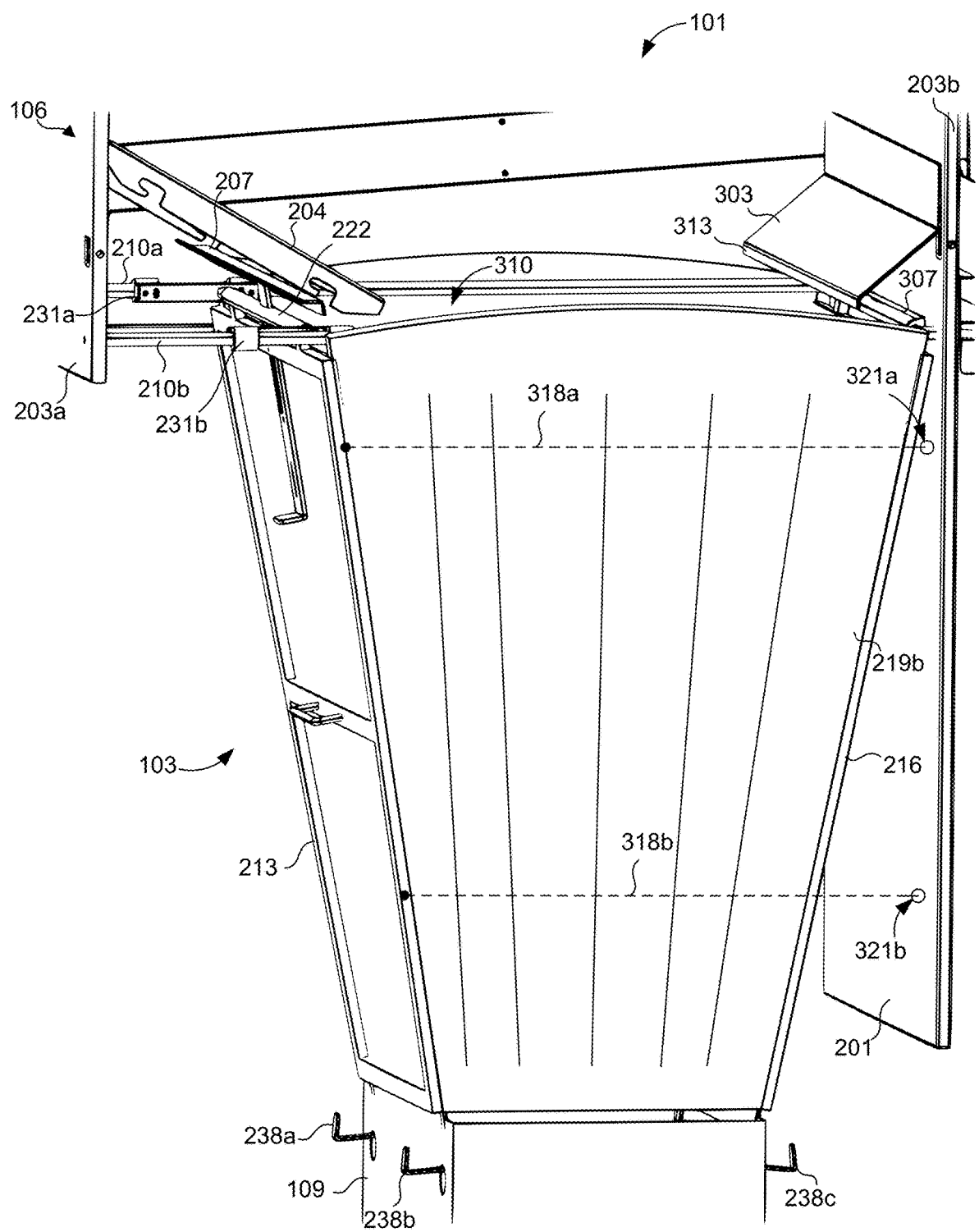
FIG. 3 is another perspective view of the adjustable chute in an open position according to various embodiments of the present disclosure.

Moving on, FIG. 2 shows a perspective view of the adjustable chute assembly 101 from FIG. 1A, in which the adjustable chute 103 is in an open state or position, and FIG. 3 shows a different perspective view of the adjustable chute 103 in the open state or position. To provide a view of certain components of the adjustable chute 103, a front panel 203a (FIG. 3) of the chimney chute 106 is omitted from view in FIG. 2, and a second side panel 202b (FIG. 2) of the chimney chute 106 is omitted from view in FIG. 3.

Referring among FIGS. 2 and 3, the chimney chute 106 has a back panel 201 that extends from a rear panel 203b of the chimney chute 106 (FIG. 3). The chimney chute 106 also has a first side panel 202a and a second side panel 202b (collectively the "side panels 202"). The chimney chute 106 also includes a front deflector 204 and a front crossbar 207. The front deflector 204 and the front crossbar 207 are secured between and separate the side panels 202.

The front deflector 204 can be used to funnel packages passing through chimney chute 106 into the adjustable chute 103 or other bulk containers positioned beneath the chimney chute 106. The front deflector 204 can ensure that packages do not travel substantially close to the front panel 203a of the chimney chute 106. Accordingly, the front deflector 204 can ensure that packages are funneled into the adjustable chute 103 when in the open state or position shown in FIGS. 2 and 3. The front crossbar 207 can also be used to lock the adjustable chute 103 in the open state or position.

Among other components, the adjustable chute 103 includes a front panel 213, a rear panel 216, a first sidewall 219a, a second sidewall 219b (collectively the "sidewalls 219"), a first rod 210a, and a second rod 210b (collectively the "rods 210"). As depicted in FIG. 2, the front panel 213 and the rear panel 216 are attached to the sidewalls 219.

The front panel 213 can be moved to different positions along the path of the rods 210. As the front panel 213 is moved, the sidewalls 219 can expand or contract, which causes the adjustable chute 103 to expand or contract. In some embodiments, the sidewalls 219 can be constructed from a flexible material to form a type of bellows, in order to enable the sidewalls 219 to expand and contract. In one example, the sidewalls 219 may be constructed to have a corrugated surface, permitting expansion and contraction. The sidewalls 219 can be formed from fabric, plastic, rubber, and other suitable flexible materials and combinations thereof. A top portion of the sidewalls 219 can expand to a greater width than a bottom portion of the sidewalls 219. Thus, these differences in widths form a funnel shape when the adjustable chute 103 is in an open state.

The front panel 213 has a trapezoidal shape, as best shown in FIG. 2, in which a top portion of the front panel 213 has a larger width than a bottom portion of the front panel 213. However, the front panel 213 may be constructed in other shapes, such as a rectangle, a square, a triangle, and other suitable shapes. In the example shown in FIGS. 2 and 3, the front panel 213 has a frame along its perimeter and subpanels within the interior of the perimeter. The front panel 213 can also include trim components that separate the subpanels. In some embodiments, the subpanels may be made from a transparent material, such as polycarbonate and other suitable materials.

The front panel 213 also includes a front hinge rod 222, a locking member 225, and a handle 228. The front hinge rod 222 can be pivotally attached to a first slider 231a and a second slider 231b (collectively the "sliders 231") (FIG. 3), at the distal ends of the front hinge rod 222. Thus, the front hinge rod 222 can enable the front panel 213 to pivot from a location toward a top edge of the front panel 213, as a hinged connection is formed between the front hinge rod 222 and the sliders 231. Thus, the front panel 213 can rotate about the hinged connection formed between the front hinge rod 222 and the sliders 231. The attachment to the sliders 231 enables for the front hinge rod 222 to move or slide along a path of the rods 210. Along with the front hinge rod 222, the front panel 213 can also move or slide along the path of the rods 210, to open and close the adjustable chute 103. Although FIGS. 2 and 3 show the front hinge rod 222 attached to the sliders 231 at a particular location, the location of the attachment between the front hinge rod 222 and the sliders 231 can vary.

The locking member 225 can be used to restrain or secure the front panel 213 at different positions along the path of the rods 210. One example of the locking member 225 is illustrated in FIG. 2. In the illustrated embodiment, the locking member 225 includes a spring 235 that is attached to the frame of the front panel 213 on a first end and attached to the locking member 225 on a second end. In the illustrated embodiment, the spring 235 provides tension that causes the locking member 225 to return to the locked position shown in FIG. 2 after being pulled or forced in a direction away from the chimney chute 106. In the example depicted, a portion of the locking member 225 is inserted and extends through an opening of the front hinge rod 222.

In another embodiment, the locking member 225 may omit the spring 235. The locking member 225 may slide vertically to engage and disengage the locking member 225 against the front crossbar 207 without the assistance of the spring 235. In another embodiment, the locking member 225 may slide laterally to secure the front panel 213 against a position on the side panels 202. The locking member 225 can represent other means for securing the front panel 213 to a particular position along the path of the rods 210. In some embodiments, the locking member 225 may have a motorized component that enables the locking member 225 to secure the front panel 213 at a particular position. The motorized component can be controlled by a controller, such as a microcontroller, a processor, or other suitable computing devices.

Although the locking member 225 is illustrated in FIGS. 2 and 3 as having an "L"-shape, the locking member 225 can be constructed in other shapes, such as a triangle shape, a circular shape, and other suitable shapes. Additionally, the position of the locking member 225 on the front panel 213 and the dimensions of the locking member 225 can also vary.

The handle 228 can be used by an operator to move the front panel 213 in directions toward and/or away from the back panel 201. The handle 228 may also be used to pivot the front panel 213 about the hinged connection formed between the front hinge rod 222 and the sliders 231.

The front panel 213 may also include a first hook 238a and a second hook 238b (collectively the "hooks 238"). The rear panel 218 may have a third hook 238c (FIG. 3) and a fourth hook (not shown) (collectively the "hooks 238"). The hooks 238 are attached to a lower portion of the frames of the front panel 213 and the rear panel 216. The hooks 238 can be used to hang a container bag 109 as shown in FIGS. 2 and 3. The hooks 238 can be inserted through openings in the container bag 109 in order to hang the container bag 109 from the hooks 238. The hooks 238 represent one example of a suitable fastener for attaching the container bag 109 to the adjustable chute 103. In other examples, the adjustable chute 103 may have pegs, clips, or other types of fasteners instead of the hooks 238.

In another embodiment, the hooks 238 attached to the rear panel 216 can be omitted. Instead, the hooks 238 can be placed on the back panel 201 and the front panel 213. The location of the hooks 238 can vary, in any case, on the back panel 103, the front panel 213, and the rear panel 216.

FIG. 3 depicts the front panel 203a and the rear panel 203b of the chimney chute 106. As depicted, the rods 210 extend between and are connected at opposite ends to the front panel 203a and the rear panel 203b. The rear panel 203b also includes a rear deflector 303 and a rear hinge rod 307.

In other embodiments, the adjustable chute 103 may include different components other than the rods 210 and sliders 231 for moving the front panel 213 along a path. For example, in some cases, the adjustable chute 103 may have a ball bearing track system for moving the front panel 213 forward and backward. The ball bearing system can include a track and multiple rollers. The track may have one or more grooves for the rollers to move forward and backward. The rollers can be attached to the front hinge rod 222 and move the front hinge rod 222 along the track.

The rear deflector 303 can be used to funnel packages passing through the chimney chute 106 into an opening 310 (FIG. 3) of the adjustable chute 103. As the front panel 213 is moved to different positions, the opening 310 of the adjustable chute 103 can be opened and closed. The rear deflector 303 can also be used to keep the packages from contacting or getting near the adjustable chute 103, when the adjustable chute 103 is in a closed position, as described in further detail below. As depicted, the rear deflector 303 may be angled with respect to the rear panel 203b. In some instances, the packages may contact the rear deflector 303 and then travel into the opening 310 of the adjustable chute 103 because of the angled surface of the rear deflector 303.

The rear deflector 303 also includes a lip 313 that extends from the rear deflector 303, in which the lip 313 extends vertically downward away from the chimney chute 106. Thus, the lip 313 can be parallel to the rear panel 203b. The lip 313 can be used as a locking position for the locking member 225. When in contact with the lip 313, a portion of the locking member 225 can be used to restrain the front panel 213 from moving in a direction toward the front panel 203a as described in further detail below.

The rear hinge rod 307 can be attached to a frame of the rear panel 216. The rear hinge rod 307 can also be pivotally attached to the back panel 201 or the rear panel 203b of the of the chimney chute 106. The rear hinge rod 307 can thus enable the rear panel 216 to pivot about the hinged connection formed between the rear hinge rod 307 and the chimney chute 106. As the front panel 213 is pulled or moved away from the back panel 201, the rear hinge rod 307 can allow the rear panel 216 to pivot.

Figure 4A:
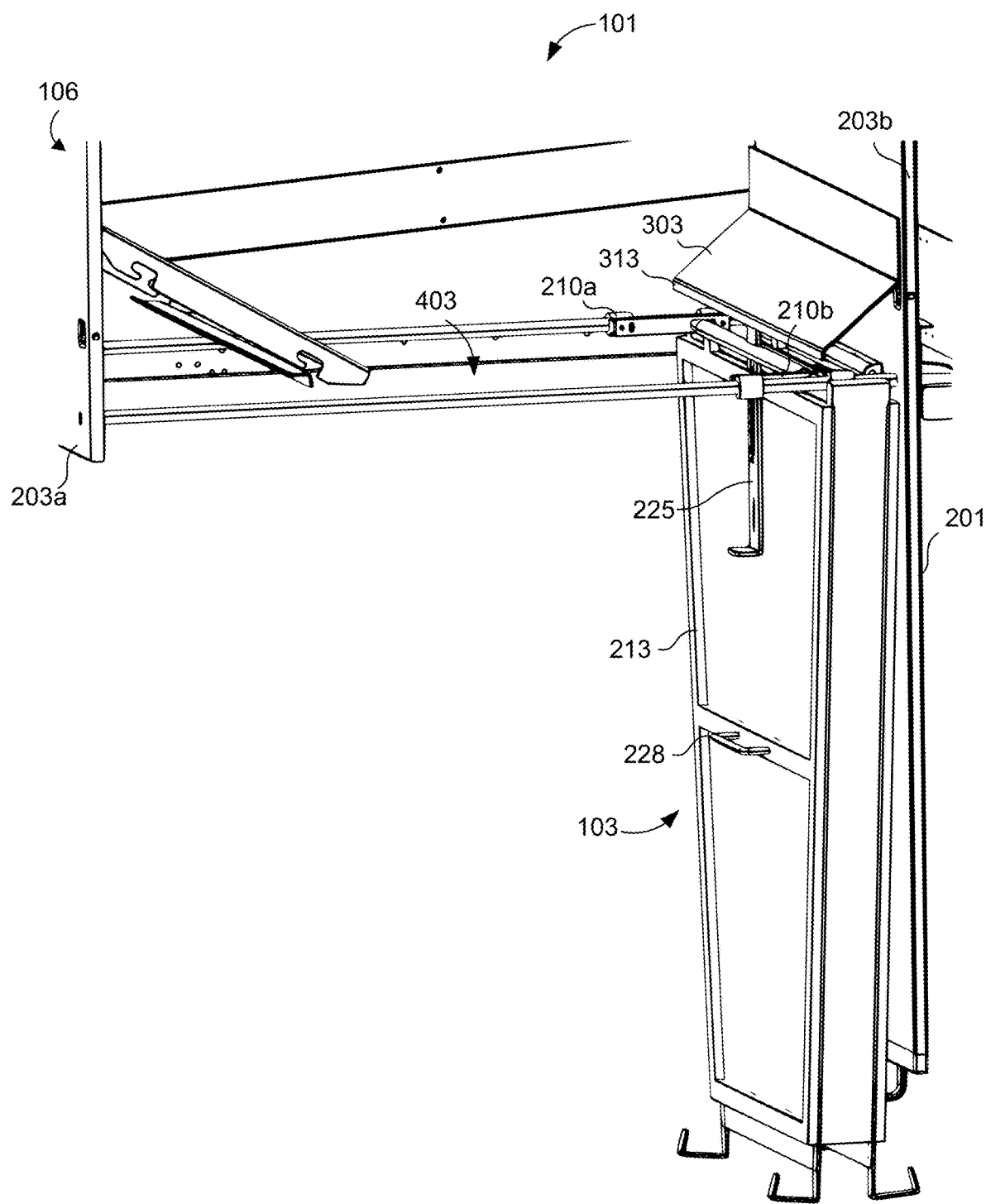
FIG. 4A is a perspective view of the adjustable chute in a closed position according to various embodiments of the present disclosure.
Figure 5C:
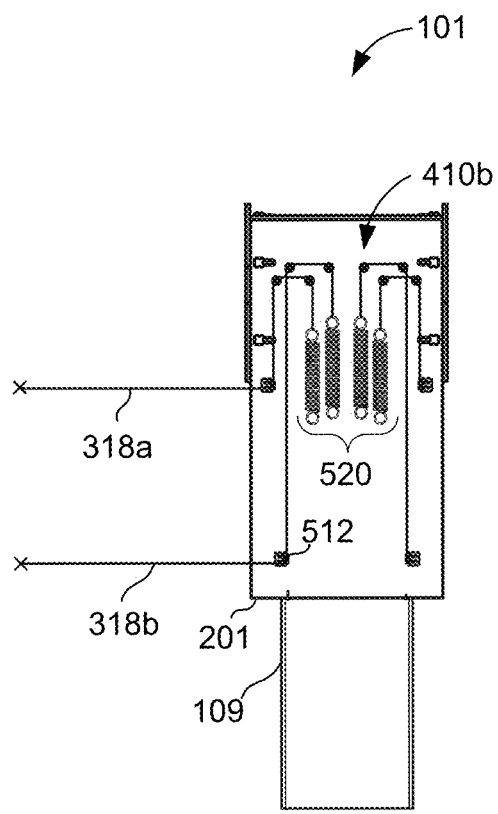
FIG. 5C depicts a rear view of a second retraction system of the adjustable chute assembly according to various embodiments of the present disclosure.

According to various embodiments, the back panel 201 includes a retraction system (FIGS. 5B and 5C). The retraction system includes a first retraction cable 318a and a second retraction cable 318b (collectively the "retraction cables 318") in the second sidewall 219b and the retraction system can also include similar cables in the second sidewall 219b. Each of the retraction cables 318 are connected at one end to the front panel 213. The back panel 201 may also include various back panel openings 321a and 321b for which the retraction cables 318 can pass through in order to connect to the retraction system as described in further detail with reference to FIG. 4A. In some embodiments, the retraction cables 318 may be interwoven into the sidewalls 219 of the adjustable chute 103. The retraction cables 318 may be made of steel, fiber, rope, or other suitable materials. The retraction cables 318 can be used to help pull the front panel 213, from the open position of the adjustable chute 103 shown in FIGS. 2 and 3, back toward the back panel 201 of the chimney chute 106, to the closed position of the adjustable chute 103 shown in FIG. 4A. The retraction cables 318 can ensure that the adjustable chute 103 compresses in a quick manner and in an organized fashion, which enables for the adjustable chute 103 to be redeployed quickly.

FIG. 3 also illustrates that the sliders 231 have an opening through which the rods 210 are inserted. The sliders 231 also have a lateral portion that attaches to the front hinge rod 222. The sliders 231 can be constructed in other shapes for traveling along the rods 210. In some embodiments, the sliders 231 are manipulated by an actuator that is controlled by a computing device. For example, the computing device could transmit a control signal to the actuator for moving the sliders 231 to different positions along the rods 210.

FIG. 3 also illustrates that a top portion of the sidewalls 219 of the adjustable chute 103 have a greater width than a bottom portion of the sidewalls 219. In FIG. 3, the bottom portion of the sidewalls 219 is adjacent to the container bag 109, and the top portion of the sidewalls 219 is adjacent to the rods 210.

Turning to FIG. 4A, shown is a side perspective view of the adjustable chute 103 in a closed positioned as depicted in FIG. 1B. In FIG. 4A, the side panel 202b is omitted from view. FIG. 4A also depicts the front panel 213 of the adjustable chute 103 secured in a closed position. In this example, the locking member 225 is secured against the lip 313 of the rear deflector 303. The lip 313 restrains the locking member 225 from moving toward the front panel 203a.

The rear deflector 303 can be used to prevent packages from falling into or onto the adjustable chute 103 in the closed position. Thus, it should be noted that a first distance between the lip 313 of the rear deflector 303 and the rear panel 203b is larger than a second distance between the front panel 213 and the rear panel 203b or the back panel 201. Accordingly, the lip 313 and the rear deflector 303 can cover the entire adjustable chute 103 and deflect packages falling through the chimney chute 106 and from the adjustable chute 103 when the adjustable chute 103 is configured in the closed position as shown in FIG. 4A. Thus, the rear deflector 303 and the lip 313 can prevent packages from falling on top of, behind, and in-between parts or components of the adjustable chute 103.

Further, when the adjustable chute 103 is in the closed position as shown in FIG. 4A, the chute opening 403 of the chimney chute 106 is open for packages to bypass the adjustable chute 103. In this configuration, the chute opening 403 allows for packages to fall directly from the chimney chute 106 into bulk containers of different sizes.

Figure 4B:
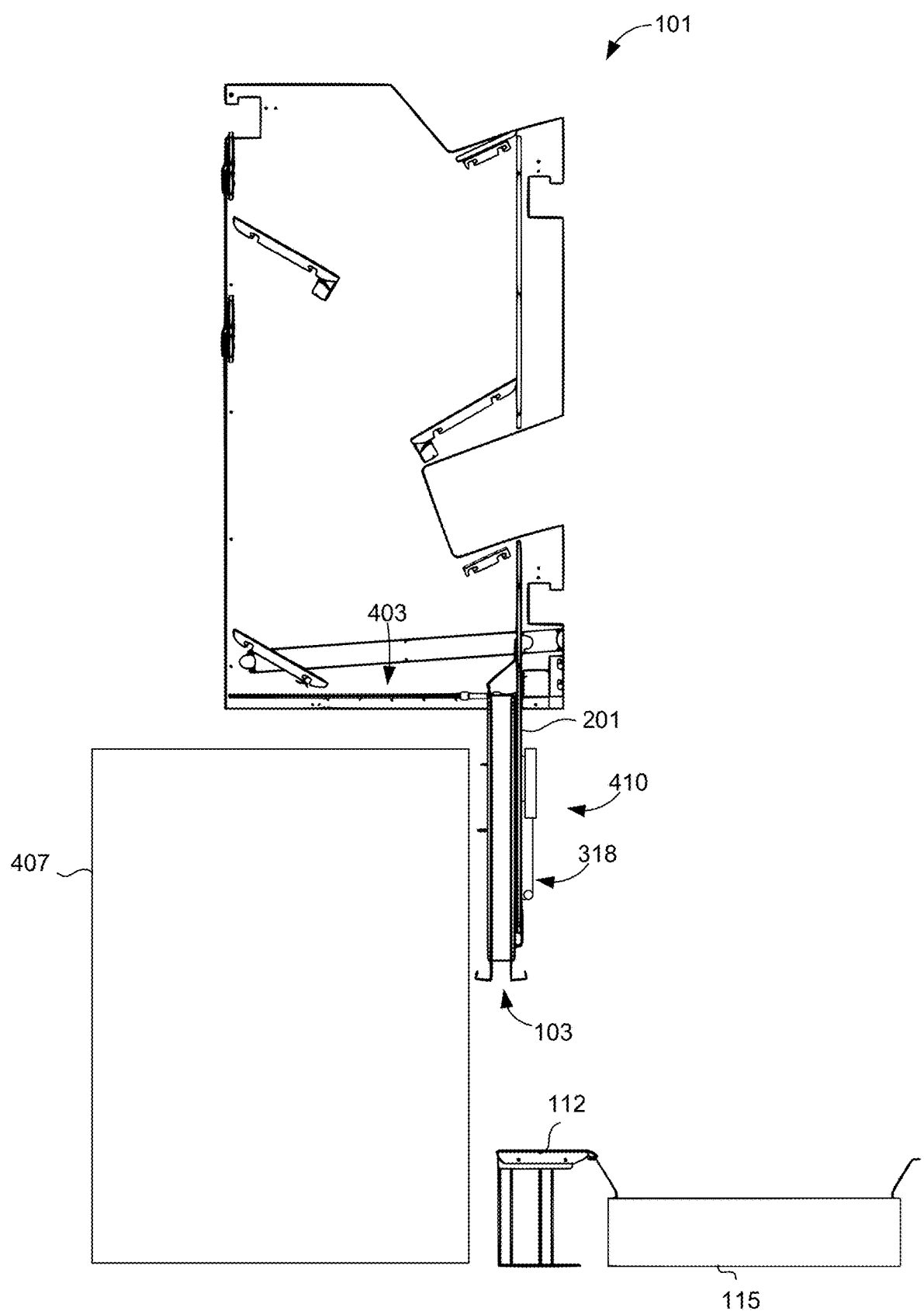
FIG. 4B is a side view of the adjustable chute and a bulker container according to various embodiments of the present disclosure.

For example, FIG. 4B illustrates a side view of the adjustable chute 103 in a closed position and a bulk container 407 underneath the chute opening 403 of the chimney chute 106. FIG. 4B illustrates how the adjustable chute 103 can be contracted or compressed out of the way, to provide clearance for the bulk container 407 to be positioned underneath the chimney chute 106.

FIG. 4B also illustrates the retraction system 410 attached to the back panel 201 and/or the rear panel 203b (FIG. 3). The retraction system 410 comprises a pulley system for guiding the retraction cables 318 as described in further detail below. The retraction system 410 helps the adjustable chute 103 to contract from an open position. For example, the retraction system 410 applies a force on the retraction cables 318 in a direction toward the back panel 201 to keep the adjustable chute 103 in a closed position. The retraction system 410 may apply the force through a weighted system, a spring-loaded system, or other suitable retraction methods, as described below. In order to move the front panel 213 (FIG. 2) of the adjustable chute 103 away from the back panel 201 of the chimney chute 106, an operator can pull on the handle 228 of the front panel 213 (FIG. 2) and overcome the force applied by the retraction system 410. Then, the operator can secure the front panel 213 by engaging the locking member 225 against the front crossbar 207 as described above with reference to FIG. 2.

It should be noted that the chimney chute 106 can have multiple crossbars similar to the front crossbar 207 (FIG. 3), each at a different position along the path of the rods 210. Accordingly, the adjustable chute 103 can be secured at various positions along the rods 210 by engaging the locking member 225 at any one of the crossbars similar to the front crossbar 207.

Next, FIG. 5A illustrates a side view of the adjustable chute assembly 101 in reference to a connection between either a first retraction system 410a shown on FIG. 5B or a second retraction system 410b shown on FIG. 5C. FIG. 5A also illustrates that the second sidewall 219b forms part of a bellows, in which the sidewalls 219 have a corrugated surface. Further, the retraction cables 318 are intertwined within the corrugated surfaces of the first sidewall 219a. The retraction cables 318 are then routed to one of the pulleys 512 and then to the first retraction system 410a (FIG. 5A), the second retraction system 410b (FIG. 5B), or another suitable retraction system 410.

In FIG. 5B, the first retraction system 410a represents a counterbalance weighted system. The first retraction system 410a includes multiple pulleys 512 for guiding each of the retraction cables 318 to one of multiple weights 515, respectively. In the depicted example, four weights 515 are illustrated, in which each of the weights 515 is attached to one of the four retraction cables 318. In the embodiment shown, the first sidewall 219a and/or the second sidewall 219b is each be connected to an independent part or portion of the first retraction system 410a. Thus, each sidewall 219 is effectively connected to an independent counterbalance weighted system.

In one example, the front panel 213 of the adjustable chute 103 can be moved away from the back panel 201. For instance, an operator may want to configure the adjustable chute 103 in an open state. As a result, the front panel 213 pulls on the retraction cables 318, which in turn pull the weights 515. The weights 515 provide a force for retracting the retraction cables 318, which in turn creates a force for retracting the front panel 213 toward the back panel 201. At an appropriate point, the operator may engage the locking member 225 to secure the front panel 213.

Afterwards, the first retraction system 410a can facilitate compressing the adjustable chute 103 toward the back panel 201. For instance, the operator can release the locking member 225 and then move the front panel 213 towards the back panel 201. The weights 515 from the first retraction system 410a provide a force for pulling the front panel 213 toward the back panel 201.

In FIG. 5C, the second retraction system 410b represents a spring-loaded system. The second retraction system 410b includes multiple pulleys 512 for guiding the retraction cables 318 to one of multiple springs 520. Each spring 520 is attached to one of the retraction cables 318 on one end and anchored to the back panel 201 at the other end.

The second retraction system 410b provides a force for contracting the adjustable chute 103. The force can be overpowered in order to configure the adjustable chute 103 for an open state. Then, as the front panel 213 is moved toward the back panel 201, the force provided by the second retraction system 410b compresses the front panel 213 toward the back panel 201, similar to the first retraction system 410a.

Figure 6:
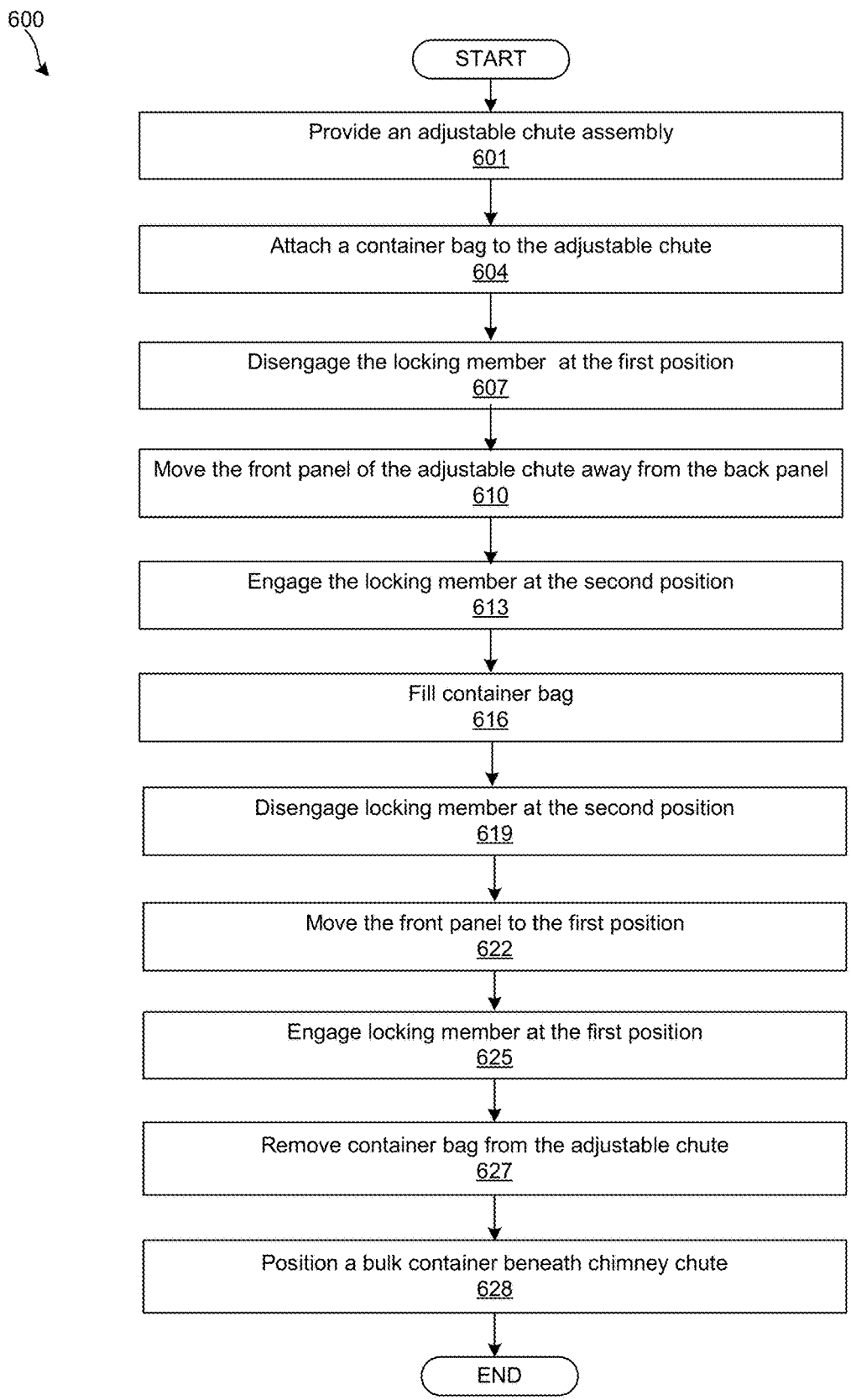
FIG. 6 illustrates a flowchart for operating the adjustable chute assembly according to various embodiments of the present disclosure.

Referring next to FIG. 6, shown is a flowchart that provides one example of a process 600 for manipulating the adjustable chute assembly 101 according to various embodiments. It is understood that the flowchart of FIG. 6 provides merely an example of the many different types of functional arrangements that may be employed to operate the adjustable chute assembly 101 as described herein.

Beginning with step 601, the process 600 includes providing the adjustable chute assembly 101 described herein, in which the adjustable chute 103 is attached to a lower portion of the chimney chute 106. As described herein, the chimney chute 106 can be configured to receive packages from one or more levels above the adjustable chute assembly 101. The packages are fed into the chimney chute 106 for the containerization of the packages into container bags 109 (FIG. 1A) or bulk containers 407 (FIG. 4B).

It is assumed at step 601 that the adjustable chute 103 is initially in a closed positioned. In the closed position, the front panel 213 of the adjustable chute 103 is compressed and substantially closer to the back panel 201 of the chimney chute 106 than in the open position. The locking member 225 is restricted by the rear deflector 303 to maintain the adjustable chute 103 in the closed position. Thus, the locking member 225 prevents the front panel 213 of the adjustable chute 103 from moving away from the back panel 201.

At step 604, the process 600 includes attaching the container bag 109 to the adjustable chute 103. In one example, attaching the container bag 109 can include inserting the hooks 238 (FIG. 2) of the adjustable chute 103 through openings in the container bag 109.

At step 607, the process 600 includes disengaging the locking member 225 from its locked position. In one example, the disengagement involves moving the locking member 225 in a downward direction away from the chimney chute 106. At this point, the front panel 213 is released and free to move away from the back panel 201 along the path of the rods 210 as described above with reference to FIG. 3.

At step 610, the process 600 includes moving the front panel 213 in a direction away from the back panel 201. The front panel 213 may be moved from its first position to a second position along the path of the rods 210. As the front panel 213 is moved away from the back panel 201, the front hinge rod 222 of the front panel 213 may pivot such that a lower portion of the front panel 213 is tilted toward the back panel 201 as described above with reference to FIGS. 2 and 3. Further, the rear hinge rod 307 may also pivot the rear panel 216 away from the back panel 201 as described above. The front panel 213 can easily move from the first position to a second position because the sliders 231 (FIG. 2) allow the front hinge rod 222 to slide along the path of the rods 210. Additionally, an operator may use the handle 228 (FIG. 2) to move the front panel 213 away from the back panel 201.

As the front panel 213 is moved toward the first position, the front panel 213 and the rear panel 216 open the container bag 109. Particularly, the bottom portions of the front panel 213 and the rear panel 216 pull or expand the top perimeter of the container bag 109 to open. The front panel 213 and the rear panel 216 can pull or expand the opening of the container bag 109 to its widest point in order to maximize the flow of packages into the container bag 109. Thus, the bottom portions of the front panel 213 and the rear panel 216 provide a tension at the top perimeter of the container bag 109 to force it open.

At step 613, the process 600 includes engaging the locking member 225 of the front panel 213 at the second position along the path of the rods 210. In one non-limiting example, the locking member 225 may be moved in a downward direction away from the chimney chute 106. By lowering the locking member 225, it provides clearance for the locking member 225 and the front panel 213 to move further away from the back panel 201 and past a point of the front crossbar 207. At this point, the locking member 225 can be released in order to allow the locking member 225 to come into contact with the front crossbar 207, restricting the front panel 213 from moving toward the back panel 201 and holding it in place.

At step 616, the process 600 can include filling the container bag 109 with packages from the chimney chute 103. The packages fall into the chimney chute 106, which in turn fall into the adjustable chute 103. From the adjustable chute 103, the packages fall into the container bags 109. After the container bag 109 has reached capacity, the process 600 can proceed to step 619.

At step 619, the process 600 includes disengaging the locking member 225 by pulling the locking member 225 in a downward direction away from the chimney chute 106, such that the locking member 225 does not contact the front crossbar 207. Then, at step 622, the process 600 includes moving the front panel 213 to the first position along the rod 210, which can include moving the front panel 213 toward the back panel 201. An operator can physically move the front panel 213 in a direction toward the back panel 201 at step 619. In some cases, the retraction system 410 can also help provide a force that pulls the front panel 213 toward the back panel 201 at step 619.

At step 625, the process 600 includes engaging the locking member 225 to secure the front panel 213 with the rear deflector 303. Thus, the locking member 225 can be lowered to allow it to move beyond the rear deflector 303. Once the locking member 225 is past the rear deflector 303, the locking member 225 can be released in order for the locking member 225 to move upward and engage or mechanically interfere with the lip 313 of the rear deflector. Accordingly, the front panel 213 is restrained from moving past the rear deflector 303.

At step 627, the process 600 includes removing the container bag 109 from the adjustable chute 103. An operator may physically remove the hooks 238 of the adjustable chute 103 from the container bag 109. Then, in some cases, the motorized bench 112 may move the container bag 109 to the conveyor system 115. In other cases, the operator may move the container bag 109 to the conveyor system 115.

At step 628, the process 600 includes positioning a bulk container 407 beneath the chute opening 403 of the chimney chute 106. Since the adjustable chute 103 is in a closed position, packages fed into the chimney chute 106 can bypass the adjustable chute 103 and can be funneled directly into the bulk container 407. The bulk container 407 may include a pallet container, a cart, and other suitable containers. In some embodiments, multiple adjustable chute assemblies 101 can be adjacent to each other in order to funnel packages into the same bulk container 407.

Although the flowchart of FIG. 6 shows a specific order, it is understood that the order may differ from that which is depicted. For example, two or more blocks shown in succession in FIG. 6 may be performed concurrently or with partial concurrence. Further, in some embodiments, one or more of the blocks shown in FIG. 6 may be skipped, omitted, or re-ordered.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A chute assembly, the chute assembly comprising:
a chimney chute comprising an opening for conveying a plurality of packages, the chimney chute comprising a back panel; and
an adjustable chute positioned at an end of the chimney chute, the adjustable chute comprising a front panel, a rear panel, a first flexible sidewall, and a second flexible sidewall, the front panel being configured to slide between an open position of the adjustable chute and a closed position of the adjustable chute, the rear panel being connected to the back panel of the chimney chute via a hinge, wherein:

the chute assembly is configured to direct the plurality of packages through the chimney chute, through the adjustable chute, and into a first container when the adjustable chute is in the open position; and the chute assembly is configured to direct the plurality of packages through the chimney chute and directly into a second container when the adjustable chute is in the closed position.

2. The chute assembly of claim 1, wherein the adjustable chute comprises a slider coupled to the front panel, the slider being configured to slide the front panel along a path between the open position and the closed position.

3. The chute assembly of claim 1, wherein the front panel comprises a locking member that is configured to retain the front panel at a position along a path between the open position and the closed position within the chimney chute.

4. The chute assembly of claim 1, wherein the adjustable chute comprises a retraction cable intertwined through at least one of the first flexible sidewall or the second flexible sidewall and is connected to a retraction system.

5. The chute assembly of claim 1, wherein the front panel is connected to a retraction cable to configure the adjustable chute from being expanded in the open position to being contracted in the closed position.

6. The chute assembly of claim 1, wherein the back panel comprises a retraction system that includes a retraction cable connected to at least one of a spring or a weight.

7. The chute assembly of claim 6, wherein the retraction cable passes through an opening in the back panel to the retraction system, wherein the retraction system comprises a pulley system.

8. The chute assembly of claim 1, wherein the first container is a container bag, and the front panel and the rear panel expand an opening of the container bag when the adjustable chute is in the open position.

9. The chute assembly of claim 1, wherein the adjustable chute further comprises a hook for retaining a bag.

10. An adjustable chute, comprising:
a first flexible sidewall and a second flexible sidewall that can expand and contract;
a front panel that is attached to the first flexible sidewall and the second flexible sidewall, the front panel having a first hinged connection, the first hinged connection being configured to slide between a first position and a second position along a path of a chimney chute; and
a rear panel that is attached to the first flexible sidewall and the second flexible sidewall, the rear panel having a second hinged connection to the chimney chute.

11. The adjustable chute of claim 10, wherein the first flexible sidewall and the second flexible sidewall form a bellows structure.

12. The adjustable chute of claim 10, wherein the path is formed by a rod that is attached to the chimney chute, and the adjustable chute further comprises a slider that attaches to the first hinged connection, the slider being configured to move along a length of the rod.

13. The adjustable chute of claim 12, wherein the front panel further comprises a spring-loaded locking structure that holds the front panel at a respective position along the path of the rod.

14. The adjustable chute of claim 10, wherein the first flexible sidewall, the second flexible sidewall, the front panel, and the rear panel form an opening when the front panel is located at the first position.

15. The adjustable chute of claim 14, wherein the opening comprises a first opening, and the first opening enables a plurality of packages to pass through the adjustable chute from a second opening of the chimney chute.

16. The adjustable chute of claim 10, wherein the front panel comprises a first hook that is oriented away from the rear panel, and the rear panel comprises a second hook that is oriented away from the front panel.

17. The adjustable chute of claim 10, wherein, when in the first position, a first distance between top portions of the front panel and the rear panel is greater than a second distance between bottom portions of the front panel and the rear panel.

18. A method for manipulating an adjustable chute, comprising:
disengaging a locking structure of a front panel of the adjustable chute, wherein the front panel is released by disengaging from a first position along a path at one end of a chimney chute, wherein the adjustable chute further comprises a first flexible sidewall and a second flexible sidewall attached between the front panel and a rear panel of the adjustable chute;
moving the front panel from the first position to a second position along the path; and
engaging the locking structure of the front panel at the second position along the path of the chimney chute.

19. The method of claim 18, further comprising attaching, via at least one fastener, a container bag to a bottom portion of the adjustable chute.

20. The method of claim 18, further comprising positioning a bulk container beneath a bottom opening of the adjustable chute.

* * * * *